(12) United States Patent
Green et al.

(10) Patent No.: US 6,630,997 B2
(45) Date of Patent: Oct. 7, 2003

(54) TEMPERATURE MEASUREMENT AND TEMPERATURE CONTROLLED SWITCHING USING CHANGE IN HELICAL SENSE

(75) Inventors: Mark M. Green, New York, NY (US); Jonathan V. Selinger, Silver Spring, MD (US)

(73) Assignee: Polytechnic University, Brooklyn, NY (US)

( * ) Notice: Subject to any disclaimer, the term of this patent is extended or adjusted under 35 U.S.C. 154(b) by 110 days.

(21) Appl. No.: 09/793,741

(22) Filed: Feb. 26, 2001

(65) Prior Publication Data

US 2002/0018511 A1 Feb. 14, 2002

Related U.S. Application Data

(60) Provisional application No. 60/194,374, filed on Apr. 4, 2000, and provisional application No. 60/186,056, filed on Feb. 29, 2000.

(51) Int. Cl.[7] .................................................. G01J 4/00
(52) U.S. Cl. ....................................................... 356/364
(58) Field of Search ................................. 356/364–370

(56) References Cited

U.S. PATENT DOCUMENTS

| | | | | |
|---|---|---|---|---|
| 3,942,872 A | * | 3/1976 | Saeva ........................... 349/165 |
| 3,943,369 A | * | 3/1976 | Saeva ........................... 250/568 |
| 4,840,463 A | * | 6/1989 | Clark et al. .................. 349/172 |
| 5,480,749 A | * | 1/1996 | Green ........................... 430/19 |
| 5,750,049 A | * | 5/1998 | Green ...................... 252/299.1 |

* cited by examiner

*Primary Examiner*—Michael P. Stafira
(74) *Attorney, Agent, or Firm*—Straub & Pokotylo; John C. Pokotylo (57) ABSTRACT

Helical arrays comprising structurally different chiral non-racemic molecules or molecular entities that control the helical sense of the helical array provide a method for temperature measurement with a unique characteristic in that the temperature dependent chiral biases of the competing structurally different chiral non-racemic entities control the helical sense population since these biases differ in their temperature dependence. By varying the composition of the chiral non-racemic entities, the temperature at which the helical sense population is equal and how the helical sense population varies as a function of temperature can be controlled.

22 Claims, 10 Drawing Sheets

Optical Rotatory Dispersion for 97-2(40%) Switchable Polymer as a Lyostropic Liquid Crystal Optical Activity measured in a 100μm cell as a function of temperature

Influence of temperature on the CD/ORD behavior in the planar texture: Terpolymer35 system g. Terpolymer35: CD and ORD spectra* at different temperatures (2% Terpolymer35 as dopant in 30%PHIC/Toluene Matrix)

CD spectra of 2% Ter35 as dopant in 30% PHIC/Toluene Matrix at different temperatures (10°C, 30°C, 35°C, 40°C, 50°C)

ORD spectra of 2% Terpolymer35 as a dopant in 30% PHIC/Toluene Matrix at 10°C and 50°C, respectively

*Measured in 0.001cm Water-jacketed quartz cell

Optical Rotatory Dispersion for 97-2(40%) Switchable Polymer as a Lyostropic Liquid Crystal Optical Activity measured in a 100μm cell as a function of temperature

FIGURE 9

Circular Dichoism Spectir for 97-2(40%) Switchable Polymer as a Lyostropic Liquid Crystal Circular dichoism measured in a 100μm cell as a function of temperature

FIGURE 10

TEMPERATURE MEASUREMENT AND TEMPERATURE CONTROLLED SWITCHING USING CHANGE IN HELICAL SENSE

§ 1. RELATED APPLICATION(S)

Benefit is claimed, under 35 U.S.C. § 119(e)(1), to the filing date of: provisional patent application Ser. No. 60/186,056, entitled "A METHOD FOR TEMPERATURE MEASUREMENT USING CHIRALITY", filed on Feb. 29, 2000 and listing Mark M. Green as the inventor; and provisional patent application Ser. No. 60/194,374, entitled "A METHOD FOR TEMPERATURE MEASUREMENT USING CHIRALITY", filed on Apr. 4, 2000 and listing Mark M. Green as the inventor, for any inventions disclosed in the manner provided by 35 U.S.C. § 112, ¶ 1. These provisional applications are expressly incorporated herein by reference.

§ 0. GOVERNMENT RIGHTS

The United States Government may have certain rights in this invention pursuant to grants awarded by the National Science Foundation and the Office of Naval Research.

§ 2. BACKGROUND

§ 2.1 Field of the Invention

The present invention relates to the field of helical arrays, such as helical polymers and, in particular, uses helical arrays for temperature measurement, or temperature controlled optical switching.

§ 2.2 Related Art

The present invention manipulates and exploits properties of helical arrays. Generally, a helical array is a molecular or supramolecular arrangement that is helical. The helical array can comprise molecules that vary greatly in molecular weight, as, for example, from a very high molecular weight DNA, to an oligomer having a molecular weight of as little as a few hundred daltons, perhaps less. Generally, such helical arrays are formed by the repetitive connection, either by forming covalent bonds or by other kinds of molecular attachments, such as hydrogen bonds, of identical groups, or a limited number of different kinds of groups.

Helical polymers have been used in various capacities, including information storage (See, e.g., U.S. Pat. Nos. 5,750,049 and 5,480,749; both incorporated herein by reference.). In the inventions described in the identified patents, a property of helical polymers was shown to allow the invention of an optical switch effectuated by irradiating, with circularly polarized light, a polymer synthesized from racemic monomer units.

Liquid crystals formed by anisotropically shaped molecules may have a nematic phase or other achiral phases between a solid phase and an isotropic liquid phase. In a cholestric phase of a liquid crystal, elongated molecules, approximately parallel within a layer over short distances, twist from layer to layer, thereby taking the shape of helices, which will prefer one handedness over the other.

Helical polymers have a property referred to as their "sense". More specifically, helical polymers can have a right-handed sense or a left-handed sense. The inventors believe that such properties of helical polymers neither have been manipulated, nor exploited for purposes of temperature measurement.

§ 3. SUMMARY OF THE INVENTION

Given a predefined temperature, the present invention describes a way to synthetically manipulate a helical array, in a rational manner based on principles of statistical physics, such that a property (e.g., optical activity) of the helical array has a predetermined value (e.g., zero) at the predefined temperature. If a different predefined temperature is desired, the helical array is further synthetically manipulated. A temperature measurement can then be made by quantitatively measuring if there is a deviation in the relevant property at temperatures above or below the predefined temperature, a technology not currently available.

The present invention provides a method for measuring temperature using helical polymers having attached molecular units, such molecular units favoring opposing helical senses. The molecular units may be chiral groups favoring different helical senses. Such chiral groups are structurally different, non-racemic molecules. The helical sense of the helical array varies as a function of temperature. The present invention also provides compositions of matter that can be used in the context of the inventive method.

In one embodiment of the present invention, temperature is determined based on optical activity, which changes as a function of relative helical sense. For example, temperature may be measured using a chiral optical effect of cooperative helical arrays subjected to a competition for helical sense between structurally different chiral non-racemic molecules. Such molecules are selected for their preference for one helical sense. The optical activity, which is a function of the relative proportion of each helical sense, therefore also varies as a function of the composition of the competing units. The present invention can therefore manipulate the helical array to have a predetermined optical activity (e.g., no optical activity) at a variety of temperatures. More specifically, the helical array can be manipulated by controlling the composition of the competing units attached to the helical array. In the case where the helical array is a helical polymer, this manipulation should be performed such that the predefined temperature is within the stability limits of the polymeric molecules. For example, for a polyisocyanate helical polymer, the predefined temperature may be from any low temperature up to about somewhat above the boiling point of water. As the temperature deviates from the predefined temperature at which there is no optical activity, the optical activity will then increase in the positive or negative direction (e.g., twist the plane of polarized light in opposite directions).

The effect of temperature on helical sense can be seen not only by measuring chiral optical properties, but also by the effect of the helical sense on a liquid crystal. In the liquid crystal case, at the specified temperature for a predetermined optical activity value (e.g., no optical activity), a nematic phase will be detected. If the temperature deviates from this set value, cholesteric phases of opposite pitch sense will be obtained. Alternatively, if the liquid crystal phase is smectic C, it would be transformed to smectic C*. Other alternatives may be encountered in liquid crystals exhibiting the effect of the helical senses transforming from equal population to unequal populations of varying proportions. The liquid crystal transformations may be observed in the manner appropriate to liquid crystals, which may involve direct observations or the chiral optical properties well known to be associated with chiral liquid crystals.

Thermally controlled optical switches are also described.

These and other objects and advantages of the present invention, as well as additional inventive features, will be apparent from the description of the invention provided herein.

4. BRIEF DESCRIPTION OF THE DRAWINGS

45.1:54.9 (Mw: 48,200, Polydispersity (Pd): 1.7); 45.5:54.5 (Mw: 46,800, Pd: 1.9); 46.8:53.2 (Mw: 42,300, Pd: 1.9); 47.0:53.0 (Mw: 219,000, Pd: 2.4); 48.2:52.0 (Mw: 45,100, Pd: 2.0).

§ 4. DETAILED DESCRIPTION OF THE INVENTION

The present invention may involve novel methods and compositions of matter for measuring temperature using properties of helical arrays, such as helical polymers. The present may also involve temperature controlled switching. The following description is presented to enable one skilled in the art to make and use the invention, and is provided in the context of particular embodiments and methods. Various modifications to the disclosed embodiments and methods will be apparent to those skilled in the art, and the general principles set forth below may be applied to other embodiments, methods and applications. Thus, the present invention is not intended to be limited to the embodiments and methods shown and the inventors regard their invention as the following disclosed methods, apparatus and materials and any other patentable subject matter to the extent that they are patentable.

§ 4.1 Functions

Measuring temperature based on the properties of helical arrays is a function that may be performed by the present invention. The present invention may function to synthesize helical arrays for such a purpose.

In the following, helical polymers with temperature dependent optical activity are described in § 4.2. Then, liquid crystals with temperature dependent nematic-cholesteric states are described in § 4.3. Finally, temperature controlled optical switches, which exploit features of the present invention, are described in § 4.4.

§ 4.2 Helical Polymers with Temperature Dependent Optical Activity

§ 4.2.1 Basic Components and Properties

Measuring temperature in accordance with the present invention uses helical arrays having attached molecular units, such molecular units favoring opposing helical senses. Temperature may be determined in accordance with the present invention, based on optical activity, which changes as a function of relative helical sense, which in turn changes with temperature. The optical activity, which is a function of the relative proportion of each helical sense, therefore also varies as a function of the composition of the competing units, that is, those units that are chiral and non-racemic and of different structure. The present invention can therefore manipulate the helical array to have a predetermined optical activity (e.g., no optical activity) at a given predefined temperature, which may be selected from a wide range of various temperatures. More specifically, the helical array can be manipulated by controlling the composition of the competing units attached to the helical array. As the temperature deviates from the value at which the optical activity is set to the predetermined value (e.g., no optical activity), the optical activity will then increase in the positive or negative direction (e.g., twist the plane of polarized light in opposite directions).

§ 4.2.2 Exemplary Components

Exemplary helical arrays that may be used are described in § 4.2.2.1. Then, exemplary molecular units that may be used are described in § 4.2.2.2.

§ 4.2.2.1 Exemplary Helical Arrays

The present invention relates to a method for detecting discrete changes in temperature as a function of chiral optical effects in suitable helical arrays. Any helical array, be it covalently bound or supramolecular, with a pathway allowing interconversion between the left and right handed conformations can be adapted for this invention. Molecules can be used to form helical arrays as used in the context of the present invention, such as those set forth at K. Tasaki, *J. Am. Chem. Soc.*, 118: 8459 (1996); E. Yashima, et al., *J. Am. Chem. Soc.*, 119: 6345 (1997); C. De Rosa and D. Scaldarella, *Macromolecules*, 30: 4153 (1997); C. De Rosa, et al., *Macromolecules*, 30: 8322 (1997); A. R. A. Palmans, et al., *Angew. Chem. Intl. Ed.*, 23: 2648 (1997); D. R. Link, et al., *Science*, 278: 1924 (1997); H. S. Kim, et al., *J. Am. Chem. Soc.*, 120: 4417 (1998); J. J. L. M. Cornelissen, et al., *Science*, 280: 1427 (1998); V. Percec, et al., *Nature (London)*, 391: 161–164 (1998); D. S. Schlitzer and B. M. Novak, *J. Am. Chem. Soc.*, 120: 2196 (1998); Gellman, *Acc. Chem. Res.*, 31: 173 (1998). (Each of these articles is incorporated herein by reference.)

In addition to these fully synthetic systems, biological molecules, such as polypeptides, can also be used for the present invention. For example, the kinds of polypeptides synthesized in the literature (See, e.g., F. Heitz and G. Spach,

*Macromolecules* 4: 429 (1971). See also: Ibid. 8: 740 (1975). Each of these articles is incorporated herein by reference.) may be adapted to show these effects.

A common feature of the literature presented above is the formation of a helical array. This term describes a molecular or supramolecular arrangement that is helical. The helical array can comprise molecules that vary greatly in molecular weight, as, for example, from a very high molecular weight DNA to an oligomer having a molecular weight of as little as several hundred daltons, perhaps less. Generally, such helical arrays are formed by the repetitive connection, either by forming covalent bonds or by other kinds of molecular attachments, such as hydrogen bonds, of identical groups or a limited number of different kinds of groups. The latter is typified by the alpha helix of proteins (such as poly(glutamic acid) or poly(phenyl alanine)) where the limited groups are constituted of amino acid units (such as glutamic acid or phenyl alanine). In one embodiment of the invention, the synthetic polypeptide is made of mixtures of amino acids of different structure and different absolute configuration so that each has a preference for a helical sense opposing the other(s).

Many helical arrays can be envisioned for this invention including polyguanidines, polythiophenes, polyisonitriles, or polypeptides. The invention involves controlling the helical sense by incorporating (e.g., chiral nonracemic) groups that are structurally different and compete to control the helical sense. The preferred situation is one in which the left and right handed helical senses are in a dynamic equilibrium with each other. The polyisocyanates for which the invention is demonstrated in § 4.2.3 below are polymers that work well for this invention.

§ 4.2.2.2 Exemplary Molecular Units

In a preferred embodiment of the invention, the molecules of the helical array are made of varying proportions of structurally different groups that compete for control of the helical sense, left or right handed. Preferred groups used in the context of this embodiment are chiral non-racemic groups that are not enantiomers of each other. (These groups may include, for example, all molecules with stereogenic centers or in other words tetrahedrally substituted carbon, or other elements such as phosphorus, silican or sulfur with four different entities at the corners of the tetrahedron.) These groups may also include molecules that are chiral but not asymmetric, but rather dissymmetric, such as the binaphthyls or alkylidenes.

In fact, any chiral molecule can serve as an influence on the helical sense of the polymer as is well understood as a first principle of stereochemistry. However, in the competition for helical sense control in this invention, the competing chiral groups are not enantiomers of each other, that is, not mirror images, but rather chiral nonracemic molecules that are structurally different. That is, the groups are structurally different. Within this preferred embodiment, there are very large numbers of such groups since organic chemistry offers virtually unlimited numbers of existing and possibly existing chiral molecules and among these many may be applicable. For this, not only should they be chiral and non-racemic, but they should also be used in the formation of the helical array. For this purpose, the chiral group may be pendant to the helical array so that the helix is formed whether or not the pendant group is chiral. Alternatively, the chiral group may be an integral part of the backbone of the helix as is the case in biologically interesting polymers such as, for example, polynucleotides or polypeptides.

There are no preferences in general among these many possible chiral groups since in each situation, for each helical array, the chiral group best for one situation may be sub-optimal for another. However, within a given type of helical array, it is best if the structurally different chiral groups are sensitive to temperature in their chiral bias favoring one or the other helical sense. Such sensitivity is most likely if there are a variety of conformational states available within the structure of the chiral groups. This characteristic of the invention is seen at work in the demonstration of the invention through the exemplary embodiment presented below. Increasing the temperature dependence of the chiral bias of the competing groups causes a stronger change in the ratio of helical senses as a function of temperature.

Generally, the structurally different chiral non-racemic groups can be in any grouping along the helical array. Preferably, the structurally different groups are randomly organized along the helical array. More preferably, the structurally different groups are alternating along the helical array. A microstructure along the helical array of blocks of the competing groups, as the word "block" is understood in the field of polymer science, would be less desirable.

In the case of the polypeptides, the helical array should be influenced in its sense by different amino acids of opposite absolute configuration. Therefore, for one example, if D-phenyl alanine is used, then L-glutamic acid competes with it.

The present inventors believe that the invention works in the following manner, in general terms. Since the chiral biases of the competing units for their favored helical sense are different, they compensate each other at some relative proportion away from 50/50. Since the competing chiral biases depend on temperature in different ways, this compensation point also depends on temperature. Hence, a polymer of fixed composition can pass through the compensation point as a function of temperature, with its dominant helical sense switching between left-handed and right-handed.

Once two proportions of the competing groups are studied, then using statistical physical methods, it is possible to predict how any proportion of the competing groups will behave and, in particular, what proportion of the competing groups will compensate each other so as to crossover zero optical activity at a particular temperature. Above and below that temperature, the optical activity will take on opposite signs.

For a particularly preferred embodiment, a polymer was designed in which structurally different chiral units compete to control the helical sense of the polymer chain. This competition leads to thermal switching of the helical sense at a compensation point that depends continuously and predictably on the composition of the polymer. This model effect is applicable to other macromolecular and supramolecular helical systems, and can be understood in terms of a theory of cooperative helical order.

§ 4.2.3 Exemplary Structures and Their Production

In many of these cases, as in the molecules used in the demonstration of this invention below, suitable synthetic procedures may be used to adapt these chiral non-racemic molecules for incorporation in the helical structure. In the molecules in the exemplary scheme shown below, this adaptation involved converting a carboxylic acid group to an isocyanate. Those skilled in the art can select and use many suitable synthetic procedures well-known for altering functional groups that will maintain the chirality of the molecule but allow the structural change necessary for incorporation in the necessary helical structure. Examples of such well-known procedures are the reaction of a carboxylic acid with suitable reagents to convert it to a nitrene type structure that undergoes a rearrangement to the isocyanate. In this case, the stereocenter carrying the chiral information is unaffected by this chemical reaction.

In general, many chiral molecules may have inappropriate functional groups to form the helical array or be pendant to the helical array. In each case, chemical reactions that maintain the chiral state with an adequate enantiomeric excess to act as a competitor for the control of helical sense are used. Such chemical reactions that maintain chiral enantiomeric excess, or control the chirality to avoid movement to the racemic state, or invert the chiral configuration in a specific manner are well know to those skilled in the art of organic chemistry. Such information is available throughout the literature and also in text books. Examples of such reactions are $SN^2$ reactions but not $S_N1$ reactions at the stereocenter, as a single example of the necessary chemistry. On the other hand, chemical reactions that do not interfere with the bonding of the stereocenter in the chiral molecule may be adequate to maintain the chiral information necessary for the competition of helical sense control in the polymer.

The following examples further illustrate the present invention but should not be construed as in any way limiting its scope.

This example illustrates one embodiment of the present invention using monomer units (1–3) as shown below:

Homopolymers synthesized entirely from the (R) enantiomers of 1, 2, and 3 showed identical circular dichroism spectra in sign and form demonstrating a preference for the same helical sense. This corresponds to a negative rotation at the sodium D-line.

Polymers that demonstrated the competition for helical sense were generated via synthesis of copolymers of various compositions with the following pairs: (R)-1 and (S)-3; (R)-2 and (S)-1. Copolymer (R)1(S)3 had the following physical characteristics: 45.1:54.9 (Mw: 48,200, Polydispersity (Pd): 1.7); 45.5:54.5 (Mw: 46,800, Pd: 1.9); 46.8:53.2 (Mw: 42,300, Pd: 1.9); 47.0:53.0 (Mw: 219,000, Pd: 2.4); 48.2:52.0 (Mw: 45,100, Pd: 2.0). Copolymer (R)2(S)1 had the following physical characteristics: 55.1:44.9 (Mw: 346,000, Pd: 2.9); 61.3:38.7 (Mw: 269,000, Pd: 2.8); 64.3:35.7 (Mw: 282,000, Pd: 2.6); 66.6:33.4 (Mw: 236,000, Pd: 2.5); 70.2:29.8 (Mw: 300,000, Pd: 2.7); 75.1:24.9 (Mw: 290,000, Pd: 2.5).

§ 4.2.3.1 Properties of Exemplary Structures

Figure 1:
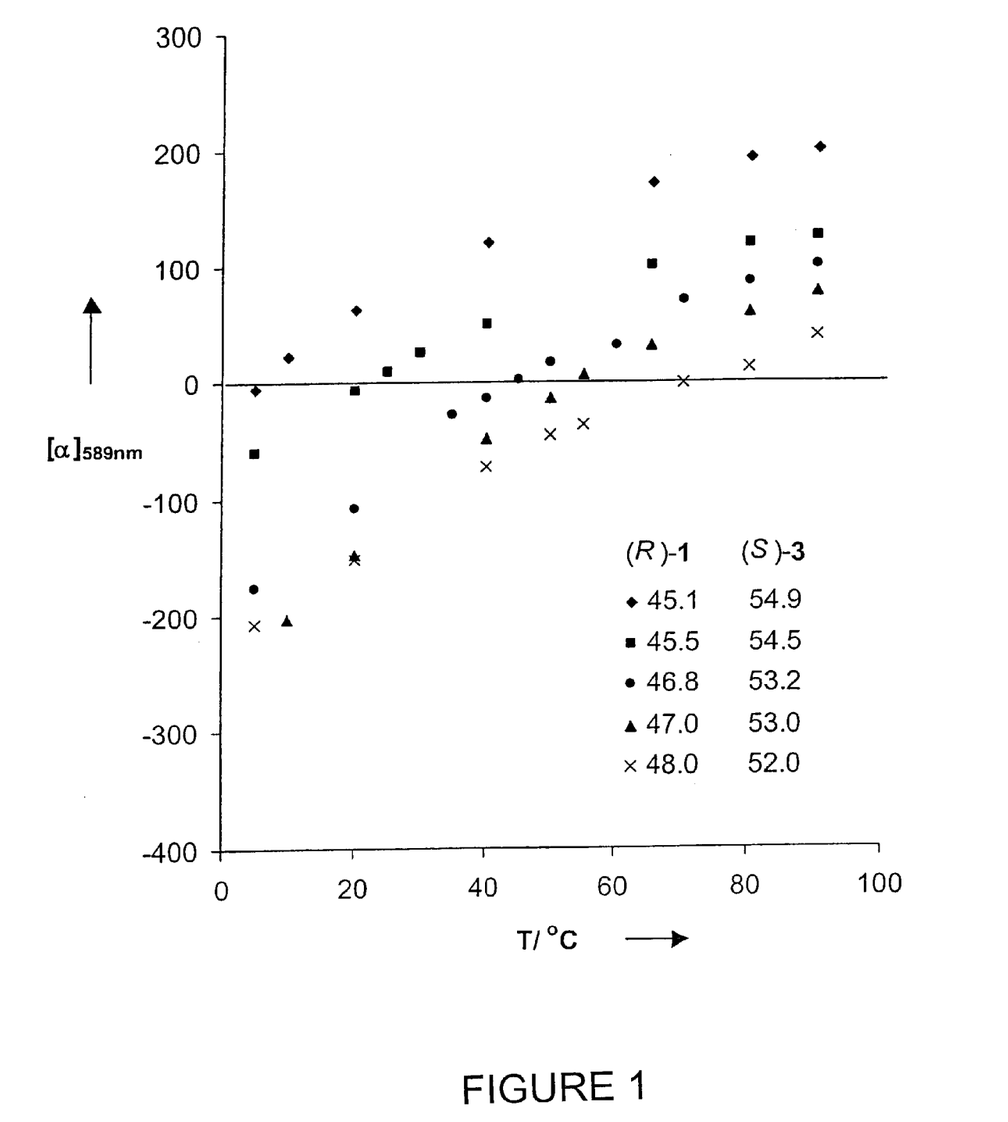
FIG. 1 is a graph of the isotropic solution optical activity as a function of temperature for the copolymer (R)1(S)3.
Figure 2:
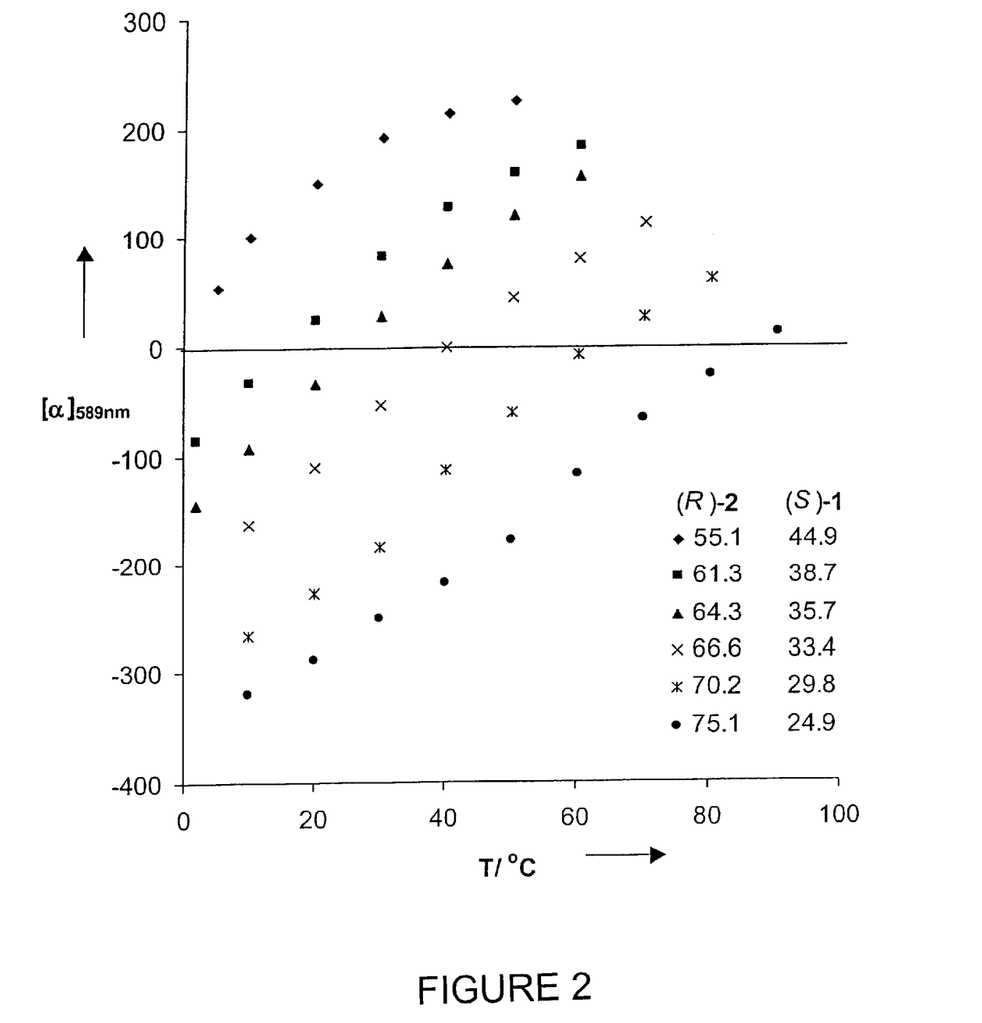
FIG. 2 is a graph of the isotropic solution optical activity as a function of temperature for the copolymer (R)2(S)1: 55.1:44.9 (Mw: 346,000, Pd: 2.9); 61.3:38.7 (Mw: 269,000, Pd: 2.8); 64.3:35.7 (Mw: 282,000, Pd: 2.6); 66.6:33.4 (Mw: 236,000, Pd: 2.5); 70.2:29.8 (Mw: 300,000, Pd: 2.7); 75.1:24.9 (Mw: 290,000, Pd: 2.5).

Using standard methods known in the art, optical activity was measured in dilute solution in toluene as a function of temperature with respect to Copolymer (R)1(S)3; and in dilute solution in hexane for the four lowest temperatures tested and in octane for the two highest temperatures tested with respect to Copolymer (R)2(S)1. The results are presented graphically in FIGS. 1 and 2, respectively.

Figure 3:
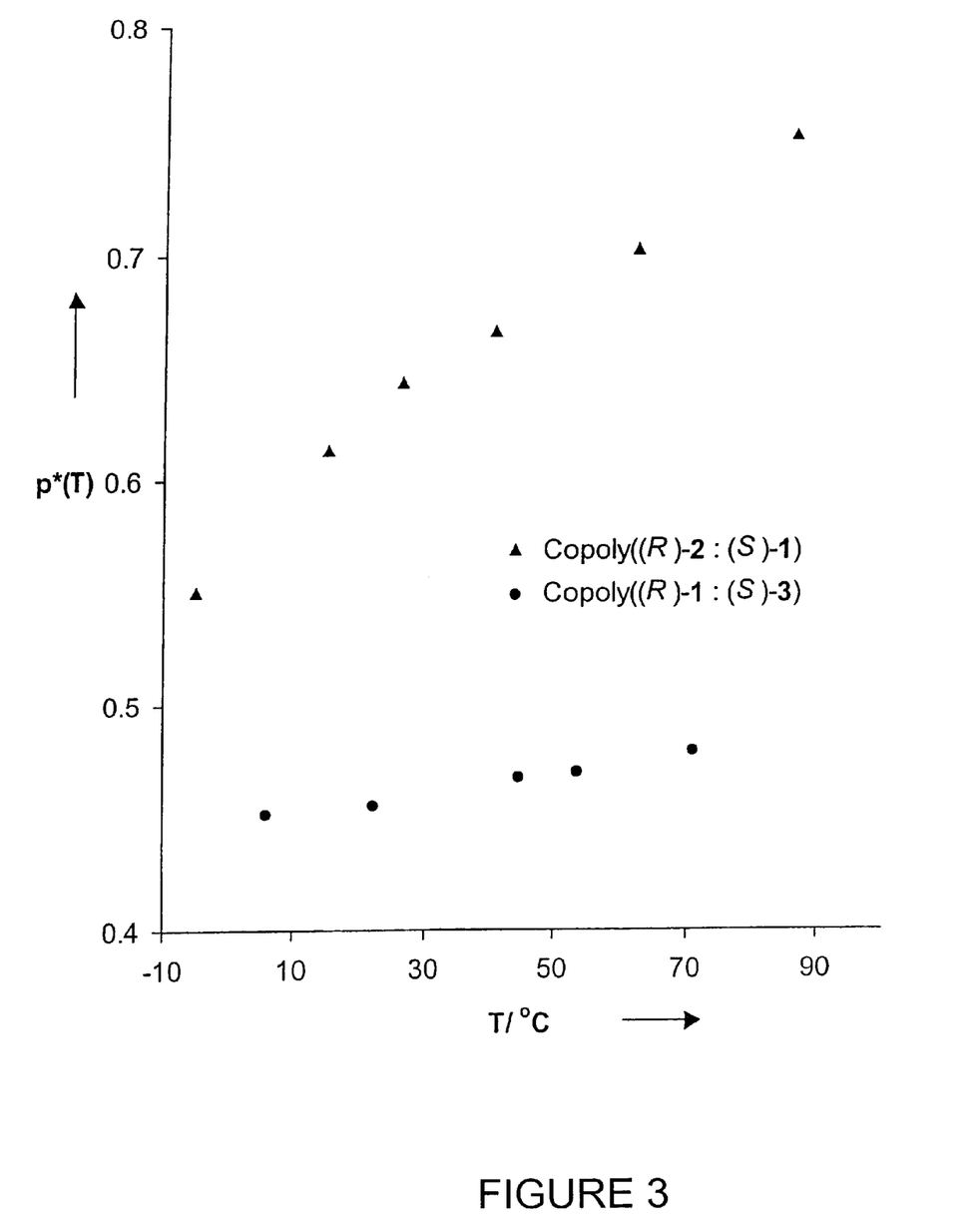
FIG. 3 is a graph that shows the relationship between composition and temperature at the compensation point for all the polymers exhibited in FIGS. 1–2.
Figure 4:
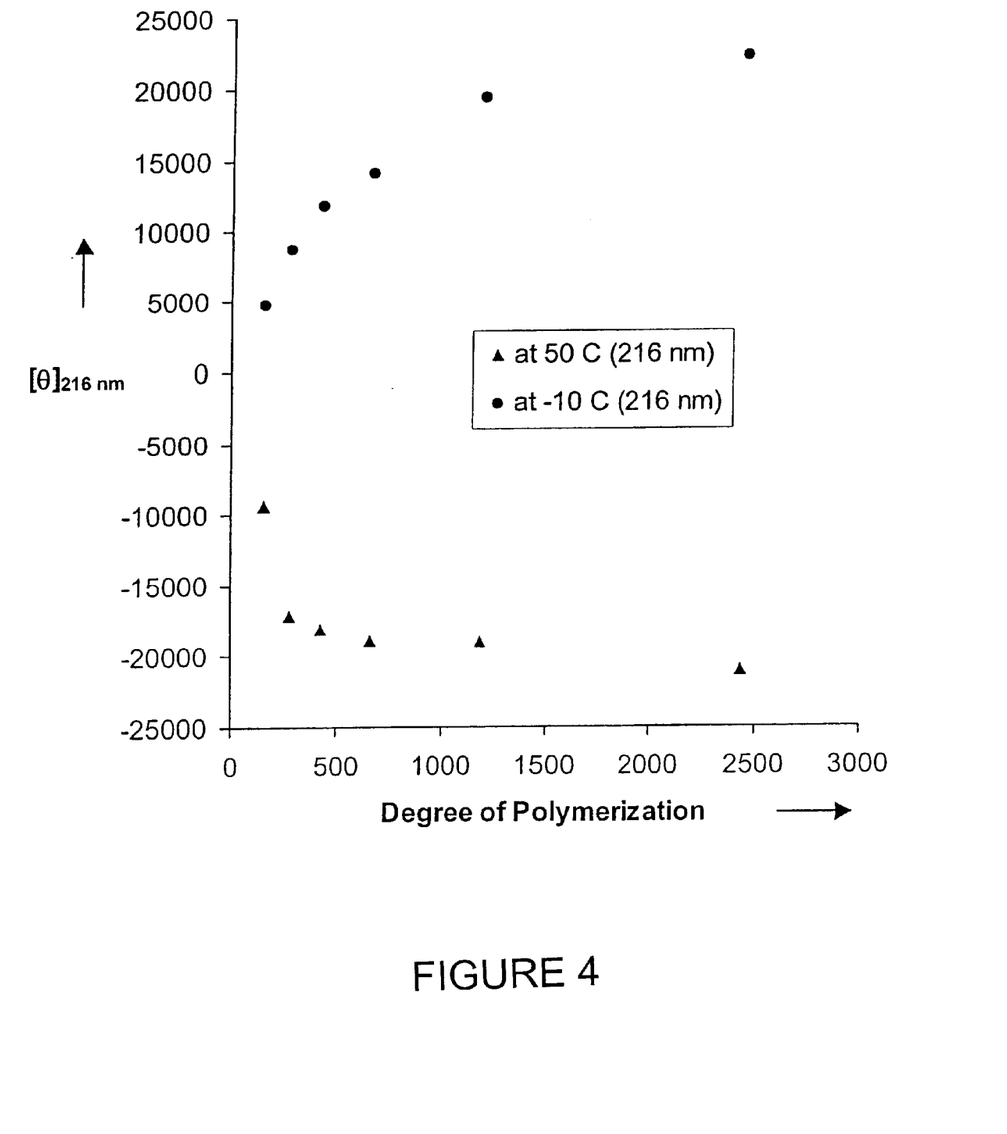
FIG. 4 is a graph that shows the isotropic solution optical activity as a function of chain length for the fractionated copolymer (R)2(S)1.

In each of these cases, the optical activity crosses zero at a predetermined and adjustable "compensation" temperature, which depends on the composition of the polymer, consistent with the basic idea presented above that the helical sense is reversed. Although the data show that the compensation point (i.e., the predetermined temperature) can be varied by simply changing the proportions of the competing chiral units in each polymer, the detailed response of the optical activity to composition and temperature differs greatly between the two systems. This difference can be understood in terms of an adaptation of a known statistical physical theory, which is set forth at: J. V. Selinger and R. L. B. Selinger, *Phys. Rev. Lett.*, 76, 58 (1996) and; K. S. Cheon, J. V. Selinger, M. M. Green, "Designing a Helical Polymer that Reverses Handedness at a Selected, Continuously Variable Temperature", *Angewandte Chemie Int. Ed.*, 39, 1482 (2000). These works are incorporated herein by reference. The correspondence to the statistical physical theory is demonstrated in the relationships shown in FIGS. 3 and 4.

§ 4.3 Liquid Crystals with Temperature Dependent Nematic-cholesteric States

§ 4.3.1 Basic Components and Properties

The present invention can be applied to liquid crystal materials. In such an embodiment, the changes in the chiral characteristics of the polymer can translate into conversions between a nematic state and cholesteric states of opposite sense. In the context of lyotropic vs. thermotropic liquid crystals, the temperature independence of the phase boundary in lyotropic liquid crystals holds an advantage over thermotropic liquid crystals. With thermotropic liquid crystals, which form the basis of liquid crystal displays ("LCDs"), mixtures of structurally different liquid crystals are used to manipulate the phase boundaries to yield wide temperature ranges. In lyotropic liquid crystals on the other hand, the phase boundary is understood (theoretically in principle) to be independent of temperature and this is seen in approximation in many experimental studies. This is the case for lyotropic liquid crystals made from rod-like mesogenic molecules, but not from lyotropic liquid crystals made from soap-like entitites. In the present invention, however, rod-like or worm-like mesogenic polymers are formed. Consequently, the type of liquid crystal with a temperature independent phase boundary to the isotropic phase is formed.

In the liquid crystal approach to the present invention, the temperature dependent helical switching polymer may be used as a dopant in a liquid crystal formed from another mesogen. Alternatively, or in addition, the temperature dependent helical switching polymer can be used as the mesogen itself. In such an alternative embodiment, every polymer in the solution may switch between helical sense at the appropriate temperature. Thus, to reiterate, this liquid crystal approach can therefore work by using the switching polymer as a dopant or as the mesogen polymer itself. For literature on the liquid crystal forming properties of the polyisocyanates see M. M. Green, et al., *J. Am. Chem. Soc.,* 120, 9810 (1998); also see Y.-C. Chiang, et al., *Macromolecules,* 30, 1992 (1997). Each of these articles is incorporated herein by reference.

A thermotropic liquid crystal may be used to measure temperature in accordance with the present invention by using the temperature switchable helical polymer as a dopant. A helical polymer that is soluble in the thermotropic liquid crystal would be used in this embodiment. In this embodiment, the control of the liquid crystal property as a function of temperature takes place by the helical polymer influencing the phase properties—nematic or cholesteric for example—of the thermotropic liquid crystal. When the helical senses are equally populated, the liquid crystal will appear nematic. However, as the temperature deviates from the compensation point, an excess helical sense of the dopant helical polymer will result. Consequently, the liquid crystal will transform to a cholesteric phase with the pitch varying as a function of temperature, growing smaller as the temperature deviates from the compensation point.

Figure 5:
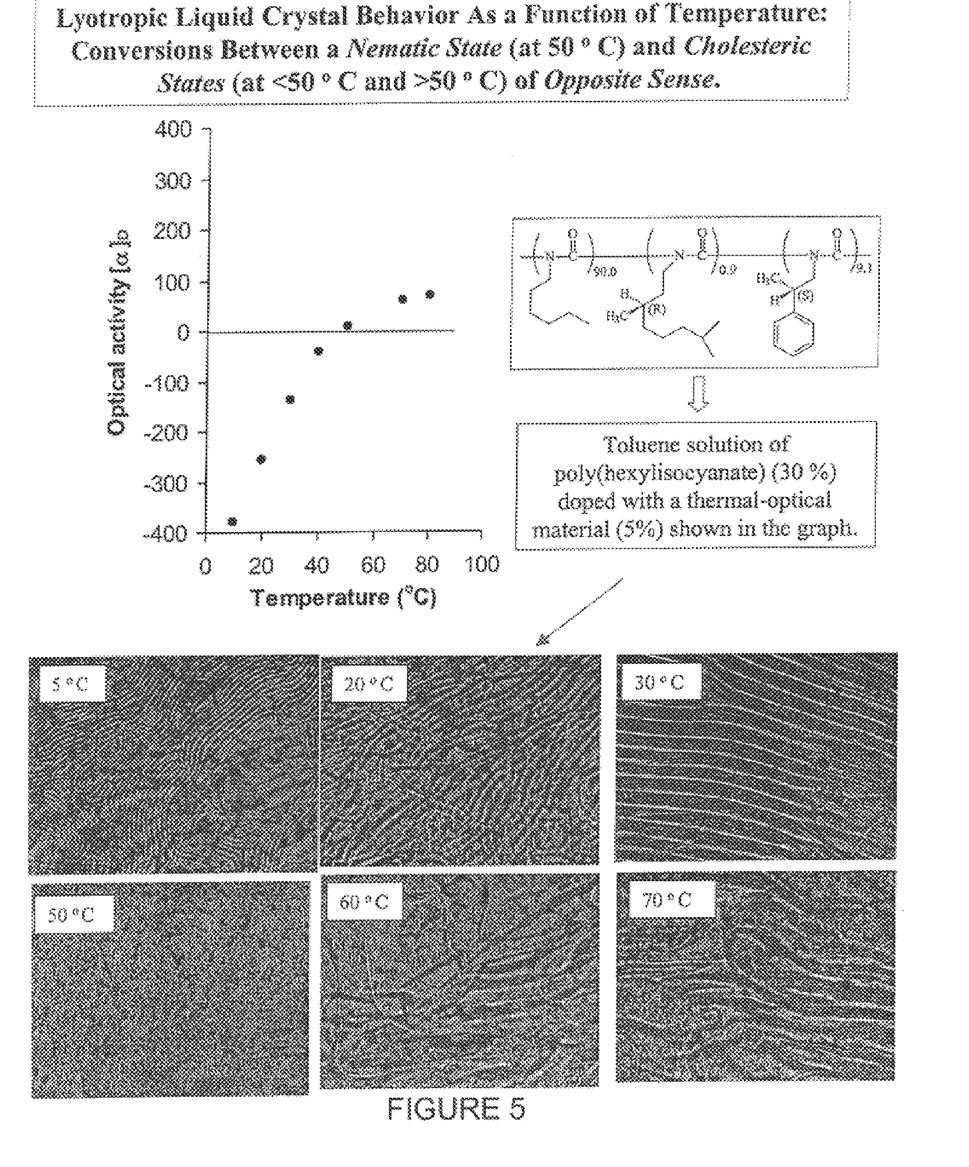
FIG. 5 illustrates the changes in a lyotropic liquid crystal matrix of poly(n-hexyl isocyanate) doped with a polyisocyanate synthesized from competing chiral groups as described in this invention.
Figure 6:
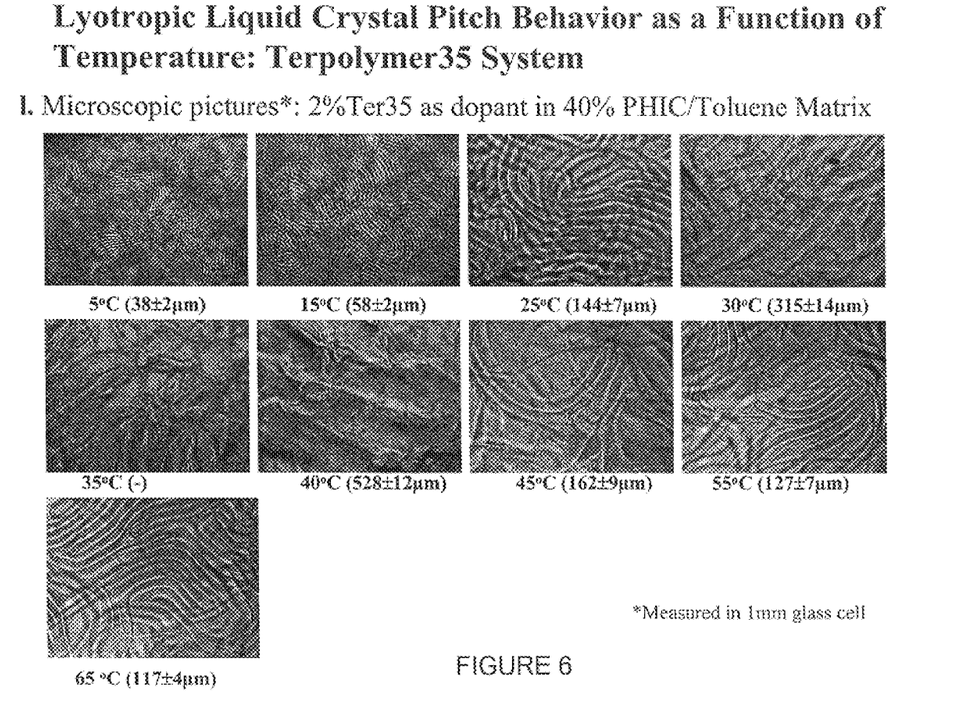
FIG. 6 illustrates the changes in a lyotropic liquid crystal matrix of poly(n-hexyl isocyanate) doped with a polyisocyanate synthesized from competing chiral groups as described in this invention.

The same liquid crystal mixtures commercially used may act as solvent for the helical array described in this invention and then have entirely different liquid crystal properties than in the commercial materials used now. The present invention is advantageous in that the (predetermined) temperature at which the liquid crystal will be nematic (i.e., the compensation point) can be controlled by varying the composition of the competing chiral groups as described above. Thermotropic liquid crystals may have advantages so that the chiral changes of the helical array with temperature will affect the phase properties of the liquid crystal as for example nematic to cholesteric (twisted nematic), or smectic C to smectic C* with all the properties attending such changes. FIGS. 5 and 6 however, demonstrate the liquid crystal effect on a lyotropic liquid crystal. More specifically, FIGS. 5 and 6 show the phase changing from a cholesteric phase of one sense, through the nematic phase, and then to a cholesteric phase of the opposite sense. The corresponding optical activity change is also shown.

Regarding the liquid crystal reading of the temperature dependent helical sense changes, this change can be seen via direct observation by microscopy of the fingerprint pattern in a microscope or measurement of the pitch by well known diffraction characteristics of a laser. The latter is a routine procedure in measuring cholesteric liquid crystal properties. Both of these techniques have been successfully employed on the liquid crystal properties of the polyisocyanates using the switching polymer as a dopant in poly(n-hexyl isocyanate), or as the mesogen itself, by using an appropriate molecular weight of a terpolymer of n-hexyl isocyanate, and two competing chiral isocyanates.

In instances where the switching polymer acts as a dopant, the liquid crystal behavior can be determined using chiral optical techniques well known to those expert in the art of liquid crystals. For the doped system described above, FIG. 7 illustrates the circular dichroism and optical rotatory properties for the liquid crystal system using the doped method.

Figure 8:
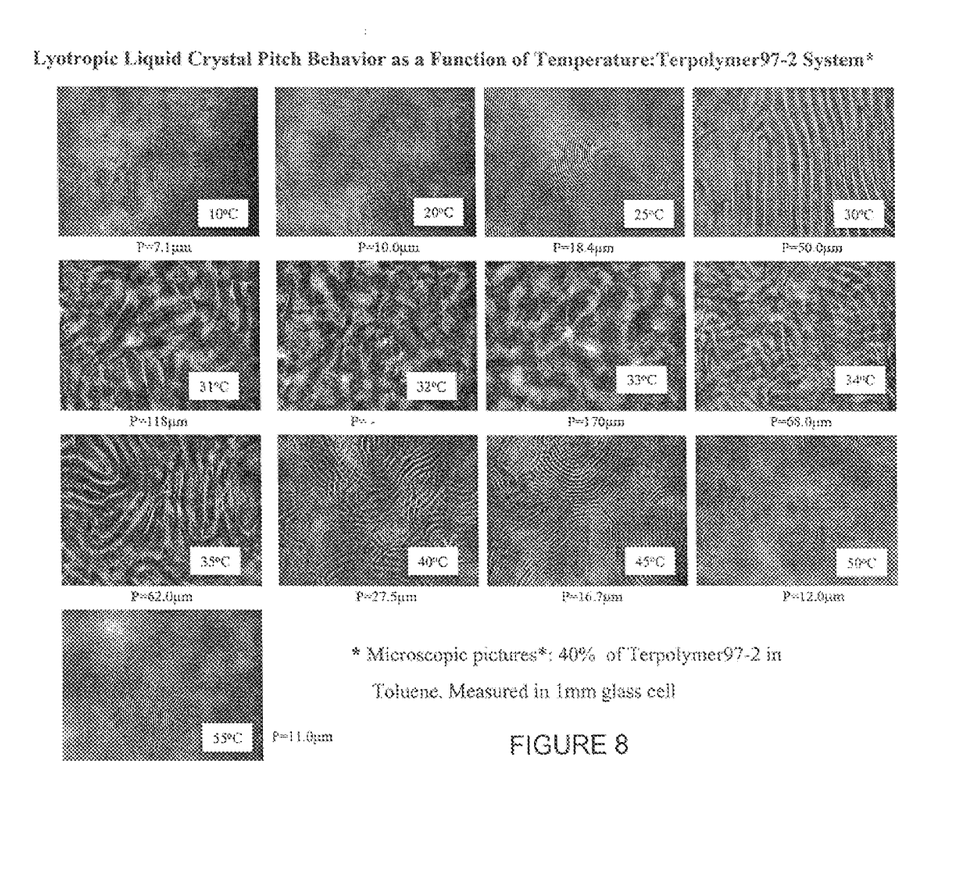
FIG. 8 illustrates the fingerprint texture for a polyisocyanate that simultaneously acts as the mesogenic polymer and as the temperature switchable polymer so that doping is not necessary. In this case, the pitch values, as can be seen, are far smaller than those in the doped system FIG. 6.

In addition, where the helical polymer capable of switching helical sense with temperature forms the mesogen itself as noted above, the effect on the liquid crystal property is seen in a similar manner to the doped system. FIG. 8 shows the fingerprint pattern passing from one cholesteric phase to another, through the nematic state at the switching temperature. Moreover, in parallel to the doped system described above, FIGS. 9 and 10 show the liquid crystal effect expressed as a chiral optical consequence in the optical rotatory dispersion and circular dichroism respectively. The switching between left and right handed cholesteric states is apparent in FIGS. 9 and 10.

§ 4.3.2 Exemplary Components

While the method of detecting a temperature change in an isotropic solution can be either direct reading of optical activity via optical rotatory dispersion, a single wavelength, or via circular dichroism at appropriate wavelengths, the molecular component that changes with temperature will be the helical array subject to the conflicting chiral information as described above. In the situation of the liquid crystal, if the dopant approach is used, via the thermotropic liquid crystal or the lyotropic liquid crystal or the thermally switching polymer, as the mesogen itself, the temperature effect on the liquid crystal can be detected via microscopic examination of a pattern of the liquid crystal or via chiral optical effects of the liquid crystal.

For the above approaches, FIGS. 1–4 illustrate the properties of the isotropic solution. FIGS. 5–10 illustrate the properties of the lyotropic liquid crystal. In FIGS. 5, 6 and 8, the liquid crystal pattern detects the change, In FIGS. 7, 9 and 10, the chiral optical property of the liquid crystal acts to detect the change with temperature.

§ 4.3.2.1 Exemplary Helical Arrays and Molecular Units

The general nature of the helical array has been described above. Exemplary components are the polyisocyanate that forms the demonstration of the invention discussed throughout, as well as other helical arrays subject to change between left and right handed helical conformations determined by conflicting input of chiral information, which depends on temperature. Another example of this element would be a polypeptide constructed of D and L amino acids of different structure. Other components of the helical array subject to the conflicting chiral information are described above in § 4.2.2.

§ 4.3.2.2 Exemplary Liquid Crystal Materials

The exemplary components of the liquid crystal can be any mixture of thermotropic liquid crystals that can dissolve the helical array, as a dopant, with its switchable temperature dependence. These mixtures are widely used in the art of liquid crystal displays having the property of a wide temperature range for their nematic phase.

Alternatively, the exemplary components of the liquid crystal can be a lyotropic liquid crystal with a wide temperature range in which the mesogen entity is the temperature switchable helical array. Alternatively, the lyotropic liquid crystal can be a mesogen that forms a nematic phase with a wide temperature range in a solvent that is appropriate for this temperature range. Dissolved in this solution is the temperature switchable helical array that influences the liquid crystal property of the lyotropic system. As in the thermotropic system, this alternative lyotropic liquid crystal embodiment is characterized as a "doped" system since the dissolved helical array imparts the temperature dependent characteristic.

Specifically, the helical array influences the lyotropic liquid crystal property to be transformed between a nematic phase and cholesteric phases of opposite pitch sense as a function of temperature. This occurs so that as temperature is changed, there is a compensation temperature forming the nematic phase. As the temperature deviates from this value, the lyotropic liquid crystal transforms to cholesteric phases of opposite pitch sense depending on whether the temperature is above or below the compensation value. As the temperature further deviates from this value, the pitch will tighten.

Figure 7:
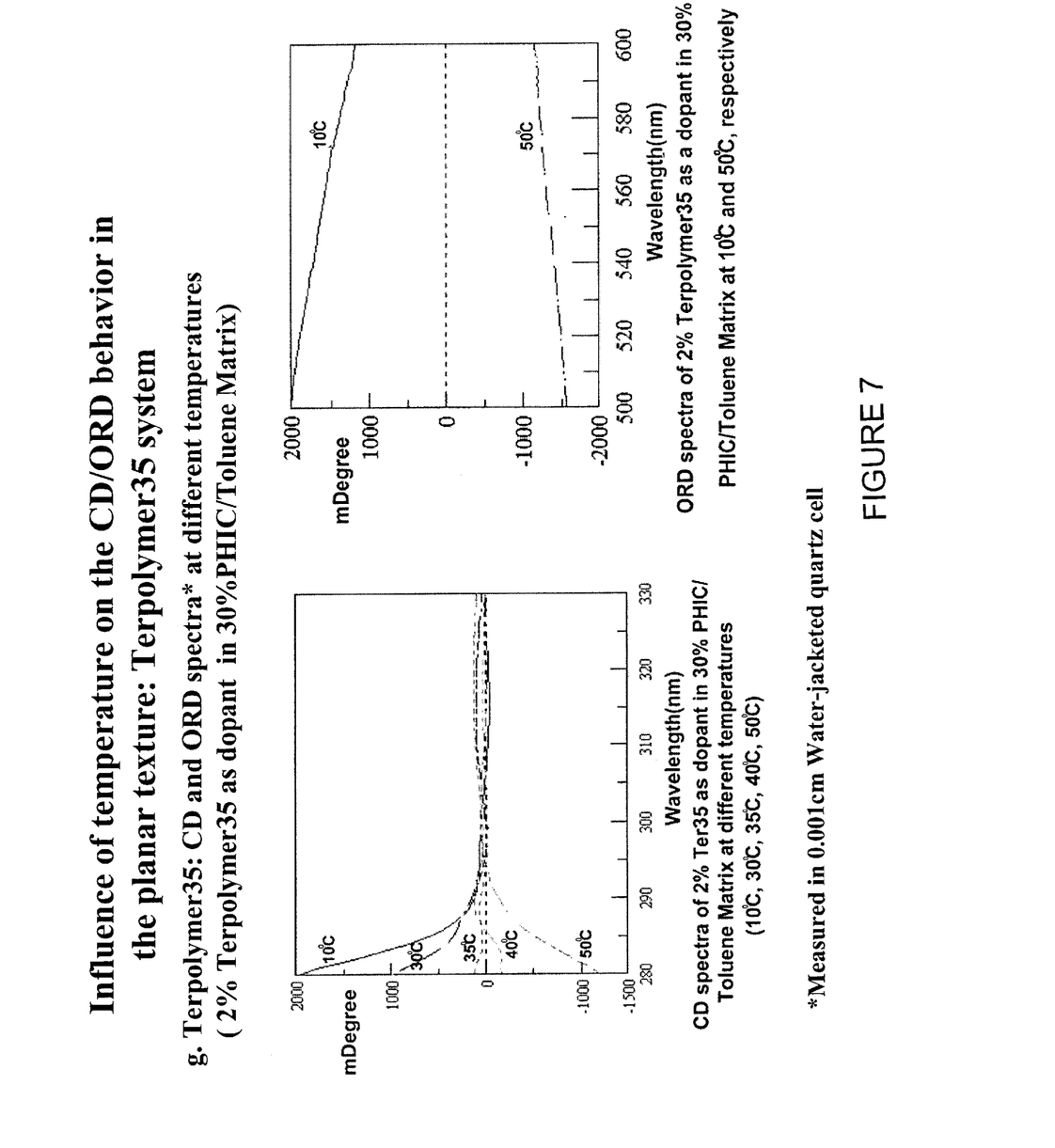
FIG. 7 illustrates the circular dichroism ("CD") and optical rotatory dispersion ("ORD") for planar liquid crystal textures of terpolymer 35 doped in PHIC, as in FIG. 6, where the fingerprint texture is shown for the same system. This texture is obtained by making the cell dimension smaller, which favors the planar texture in the polyisocyanates. For the ORD and CD data in contrast to the fingerprint texture, the sense of the cholesteric can be identified. From FIG. 7, it can be seen that the sense of the cholesteric pitch changes sign.

A polymer with appropriate characteristics to act as a temperature switchable lyotropic liquid crystal either as the mesogen itself, or as the nematic matrix to be influenced by the dissolved switchable helical array (dopant), is the polyisocyanate. For example, exemplary liquid crystal materials include the lyotropic liquid crystal formed from poly(n-hexyl isocyanate). In this case, the use of poly (n-hexyl isocyanate) falls under the category of a lyotropic system in which the responsible mesogen forms an inherent nematic phase, which can be influenced by the chirality of the temperature switchable helical array to cholesteric states of opposing sense and variable pitch as described in this invention. In this case, the switchable helical array was also a polyisocyanate, but was substituted with the competitive chiral group described in this invention. The results of this manifestation of the invention are shown in FIGS. 5 and 6 and 7.

In the present invention, the polyisocyanate may be used as the switchable helical entity so that the polymer plays two roles simultaneously—the temperature sensitive helical array and the mesogenic polymer forming the liquid crystal. This is accomplished by forming the polyisocyanate with the competing chiral units at a molecular weight allowing concentrated solutions of the polymer. For this purpose, a published procedure was used that worked effectively to produce the proper molecular weight for appropriate solubility in toluene to form the lyotropic liquid crystal. (Y. Okamoto, Y. Nagamura, K. Hatada, C. Khatri and M. M. Green, "An Unexpected Chiral Spiro Tetramer Offers Mechanistic Insight into an Improved Sodium Cyanide Initiated Polymerization of n-Hexyl Isocyanate in Toluene", *Macromolecules,* 25, 5536 (1992). This article is incorporated herein by reference.) Using the switchable polymer as the mesogenic matrix has a great advantage in that at temperatures away from the compensation point (where the helical senses are equally populated), the pitch is much smaller than for the doped lyotropic system. For this system, the planar texture is very stable and free of form birefringence. In addition, the small pitch causes a large increase in the speed of the response of the liquid crystal cholesteric pitch property to temperature. The liquid crystal responds instantly to temperature change on a laboratory time scale. This type of system is demonstrated in FIGS. 8, 9 and 10.

Exemplary thermotropic liquid crystals may include as, for example, E-7 and others like it, as well the commonly used mixtures of liquid crystals used to detect temperature changes as are commonly sold. The appropriate solubility for the temperature switchable polymers in these thermotropic liquid crystals is used. By using lower molecular weights of the temperature switchable polymers, which anyone skilled in the art of polymer science can recognize, such an appropriate solubility can be determined. In this approach of using thermotropic liquid crystals, the switchable polymer acts as a dopant in transforming the phase of the liquid crystal between nematic and cholesteric or between smectic C and smectic C* or between any achiral and chiral liquid crystal phase.

§ 4.3.3 Exemplary Structures and Their Production

The following describes an exemplary structure and its production. A terpolyisocyanate was synthesized from competing units whose structures are shown in § 4.2.3 above. The method of synthesis follows that described in: Y. Okamoto, Y. Nagamura, K. Batada, C. Khatri and M. M. Green, "An Unexpected Chiral Spiro Tetramer Offers Mechanistic Insight into an Improved Sodium Cyanide Initiated Polymerization of n-Hexyl Isocyanate in Toluene", *Macromolecules,* 25, 5536 (1992). This article is incorporated herein by reference. The molecular weight of the polymer was controlled to be in the range of 50,000 with fairly narrow dispersity and a solution of 40 weight percent in toluene was made. This solution showed lyotropic liquid crystal behavior as evidenced by observation between crossed polars in a microscope.

The polymer was made of 10.68% aromatic chiral units, 0.02% of aliphatic chiral units (see the structures shown above in the patent) and 89.3% of hexyl units. In dilute solution measurements, this terpolymer was shown to switch from negative to a positive optical rotation in the visible region of the spectrum at near to room temperature. A liquid crystal solution was made of this polymer of 40 weight percent in toluene and observation of the pitch of the resulting cholesteric phase showed itself to be nematic at near to the temperature of the dilute solution zero optical activity. Above and below this temperature, the cholestic pitch became smaller as the temperature moved further away from the compensation point. The data are shown in FIG. 8. More specifically, FIG. 8 shows the fingerprint texture for a polyisocyanate that simultaneously acts as the mesogenic polymer and as the temperature switchable polymer so that doping is not necessary. In this case, the pitch values, as can be seen, are far smaller than those in the doped system FIG. 6. Not shown in FIG. 8 is that the pitch changes at least as quickly as the temperature changes, which is very fast for a polymer based lyotropic liquid crystal. This pitch property and the conversion at the compensation temperature to the nematic phase can also be measured using diffraction of laser light as is usual for small pitch values as seen here. In addition, this system of using the switching polymer as the mesogen shows the effect in FIGS. 9 and 10 for the chiral optical effects caused by this switching as optical rotatory dispersion and circular dichroism of the liquid crystal. The data in FIG. 9 also demonstrate the power of the detection in that the ordinate axis is observed rotation and not specific rotation. These are very large effects.

Since the compensation temperature at which the liquid crystal converts from a cholesteric phase of one sense to the other, through the nematic phase, can be easily adjusted by changing the composition of the chiral units, this invention allows these liquid crystal properties to yield information on temperature over a wide range, namely from as low temperature (within the fluid range of the system) to approximately above the boiling point of water (where the polymer decomposes).

How the pitch changes with temperature depends on the nature of the response of the helical sense population of the polymer to temperature. This is as understood from statistical physics as discussed in: K. S. Cheon, J. V. Selinger, M. M. Green, "Designing a Helical Polymer that Reverses Handedness at a Selected, Continuously Variable Temperature", *Angewandte Chemie Int. Ed.,* 39, 1482 (2000). This work is incorporated herein by reference.

§ 4.4 Optical Switch

§ 4.4.1 Basic Components and Properties

This present invention may also be used to provide a reversible switch in which a reversible change in temperature will produce a chiral optical change or a detectable liquid crystal property. This would be an optical switch so that a reversible change in temperature brought on in some well known way (as, for example, via electrical or photonic energy, or irradiation with a laser using for example a laser diode and a suitable dye as is well known in the art of photophysics), would be detected by the changes associated with competition for the ratio of helical senses as described in this invention.

Figure 9:
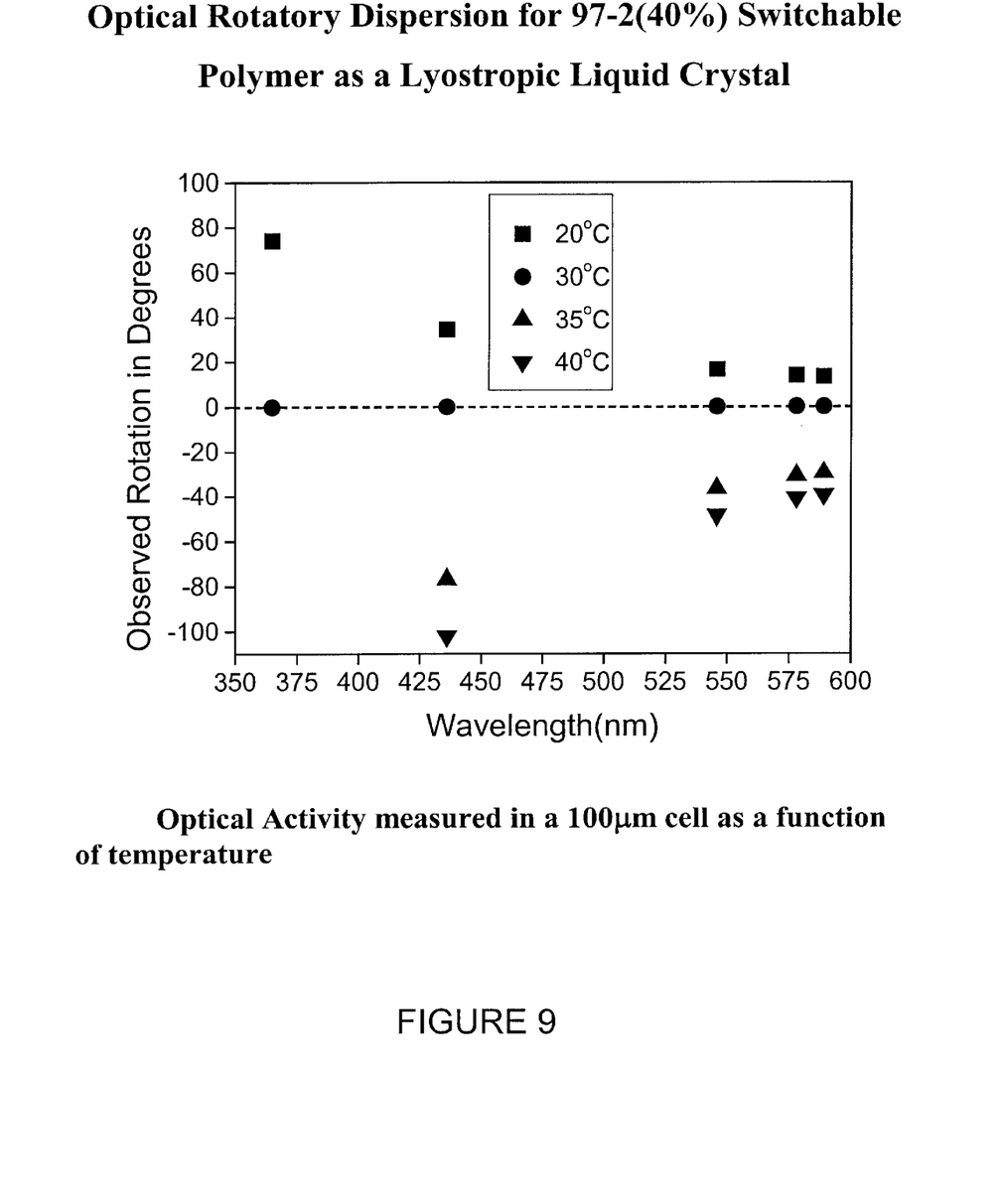
FIG. 9 illustrates the optical activity as a function of temperature and wavelength for a planar texture in a 100 micron cell for the identical sample exhibited in FIG. 8.
Figure 10:
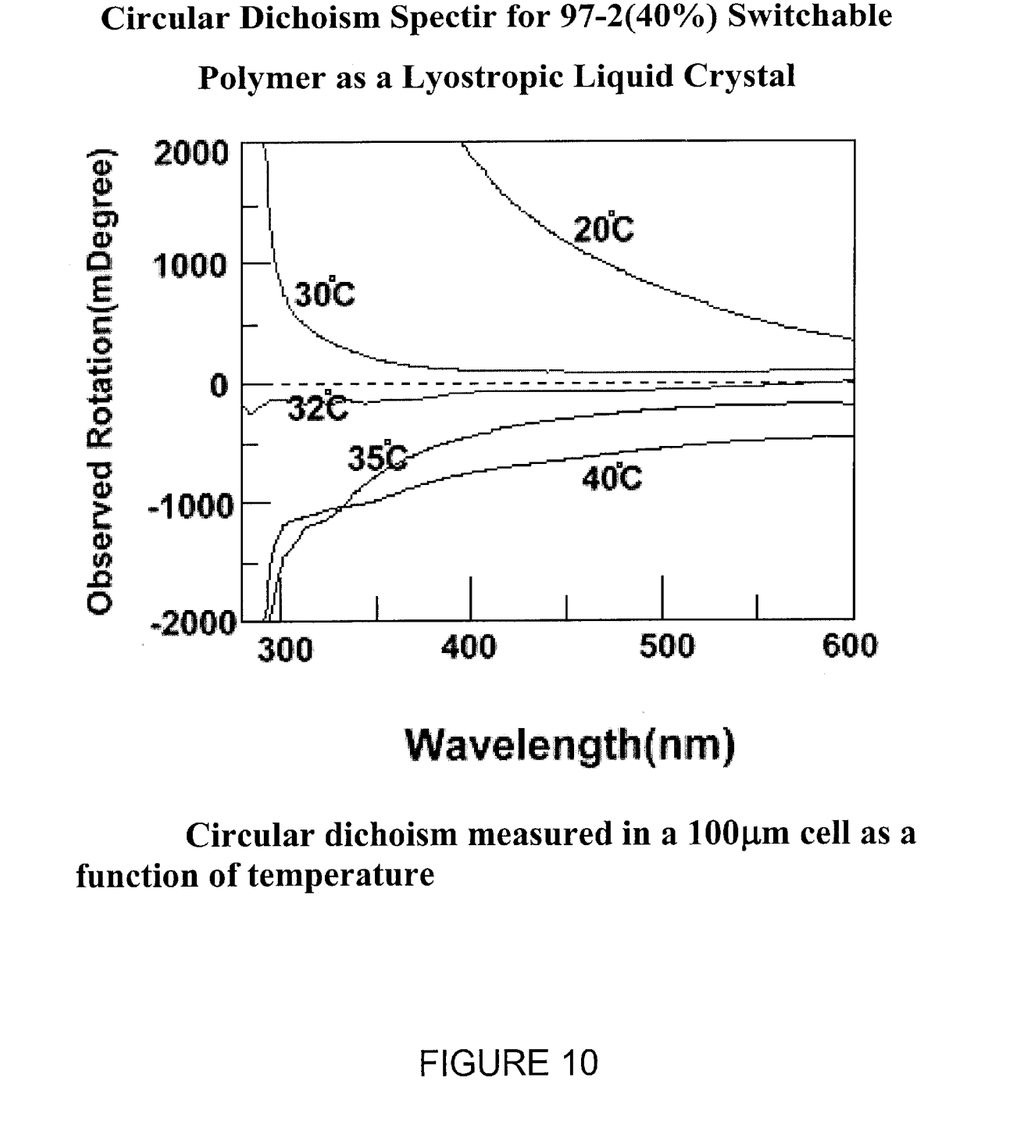
FIG. 10 illustrates the circular dichroism as a function of temperature and wavelength for a planar texture in a 100 micron cell for the identical sample exhibited in FIGS. 8 and 9.

The optical changes associated with temperature, changes that form the basis of the present invention, can be fully reversible as is essential in the formation of an optical switch. Alternatively the change may be focused on when the invention is used to detect deviation in one direction from a pre-set temperature. But in any case, increasing temperatures can be distinguished from decreasing temperatures with respect to the compensation temperature at which the helical senses are equally populated. The zero compensation temperatures that are specific for different compositions of the competing chiral moieties are useful in the use of this invention for an optical switch since the liquid crystal will be nematic. In use as a switch, a deviation from this temperature will affect conversion to a cholesteric phase. Although the pitch can be controlled by the temperature reached, the switch will be perceived simply by the textural change in the liquid crystal, which can be detected in several ways as is well known to those skilled in the art of liquid crystals. Alternatively the switching can be detected by the chiral optical changes associated with liquid crystals, which can be intense as seen in FIGS. 9 and 10. Although these figures do not show a switch per se, they demonstrate the intense chiral optical effects associated with the deviation from the nematic to the cholesteric state. In this way, whether there is a deviation from that temperature can be determined even if knowledge of the direction or magnitude of that deviation is not critical as may be the case in a switch or otherwise.

This aspect of the invention would be enhanced by the speed of the switch. By using the helical polymer as the mesogen, very small pitch values are advantageously obtained in the cholesteric state formed. Consequently, as is well known in the art of liquid crystals, the pitch responds rapidly to temperature change. Therefore, for this invention to be used as an optical switch, which depends on temperature change, the temperature should be varied consistent with the desired property of the optical switch. The switch property could then use either the chiral optical change in dilute solution or use the liquid crystal changes discussed above. For the latter, it would be best for speed of the switch if the temperature change leads to a small pitch. For this it is best to use the system in which the mesogen and helical sense properties are combined in the same polymer as described above in the example in section § 4.3.3.

§ 4.5 Further Applications

The present invention also provides an important use for the optical characteristics of the helical array and the effect of this array on, for example, a liquid crystal in that it yields a new way to connect an optical characteristic with temperature.

Many helical arrays are accessible for this kind of invention, all with their own particular properties, but all subject to the same effect allowing incorporation of their unique natures, which will affect the invention in ways that are not fundamental to how it works but only cause changes in the details of the relationship between the temperature effect on the helical array and how temperature affects the left-handed and right-handed helical population, and the subsequent effect of this on the chiral optical properties and, as shown above, on the liquid crystal properties.

The present invention can be incorporated in a plastic matrix that can be made from the helical array itself, when the material properties are appropriate or by dissolving or blending the helical array in a plastic matrix. See, for example, C. A. Khatri, et al., *Macromolecules*, 28, 4719 (1995) (This article is incorporated herein by reference). It follows, therefore, that the response of the helical array to changes in temperature can occur above the glass transition temperature but be frozen below that temperature. Indeed, it is also apparent that this invention involving a temperature dependent competition between structurally different chiral groups for control of the helical sense of a helical array can be used in any material state that allows the conformational change between the helical senses. How such a helical change can occur as a function of the material properties of a plastic matrix has been the subject of recent study. (B. T. Muellers, J.-W. Park, M. S. Brookhart, M. M. Green, "The Glassy State and the Secondary Structures of Chiral Macromolecules: Polyisocyanates and Polyketones", *Macromolecules*, 34, 572 (2001). This article is incorporated herein by reference.).

The present invention is widely applicable to any material state under the conditions of conformational change noted above. In this case, the helical array may be incorporated in a low glass transition temperature matrix thereby providing a solvent that cannot easily evaporate, but that allows the dynamic interconversion between the helical senses. In this way, a plastic device could be constructed so that the path length of the light through the plastic, when using the invention in the isotropic rather than the liquid crystal mode, is long enough to easily detect the optical activity change associated with temperature deviations form the zero compensation temperature, the latter depending on the composition of the competing chiral groups as described in the invention. Alternatively such a plastic device could be constructed so that the plastic matrix acts as a solvent for the liquid crystal so that the temperature change acting either to measure a deviation from a pre-set temperature, or as an optical switch, can be detected in one of the several ways demonstrated for this invention for liquid crystals.

Regarding the use of a plastic matrix, the side chains of the helix could be used to form the plastic matrix so that the matrix is attached chemically to the helical polymer subject to the temperature dependent helical sense property. This could be accomplished for all aspects of the invention. Such an approach to this invention, for one example, could use a silicon substituted side chain in a polyisocyanate so that the helix is dispersed among its own side chains, which then act as a solvent or the helix for isotropic solution optical activity measurements, or alternatively, as the solvent to form the concentrated solution for the liquid crystal. Those skilled in the art of polymer synthesis and liquid crystal polymers will appreciate such an approach.

While this invention has been described with an emphasis upon preferred embodiments, it will be apparent to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

What is claimed is:

1. A method for temperature measurement comprising:
   a) providing a helical array, the helical array including, or being attached to, molecular units that favor opposing helical senses; and b) measuring an optical effect in a molecule forming a part of the helical array,
wherein the optical effect is a function of a helical sense of the helical array.

2. The method of claim 1 wherein the molecular units are structurally different, chiral, non-racemic molecules.

3. The method of claim 1 wherein the optical effect is a chiral optical effect.

4. The method of claim 1 wherein the molecular units are part of the helical array.

5. The method of claim 1 wherein a composition of the molecular units, which favor opposing helical senses is selected such that the helical array has a predetermined optical activity at a predetermined temperature, and
wherein the temperature at which the helical senses are equally populated corresponds to an effectively or nearly zero optical activity corresponding to the canceled optical activity arising from the helix.

6. The method of claim 1 wherein for a given composition of the molecular units affecting the helical array sense, any deviation from the temperature at which the helical senses are equally populated, with an effective zero optical activity, will cause the helical array to favor one or the other sense depending on whether the temperature is above or below the equal population temperature.

7. The method of claim 2, wherein for a particular composition of the structurally different chiral, non-racemic, molecular units affecting the helical array sense, temperature in its effect on the helical sense population will be seen as a change in a chiral optical effect of an isotropic array of the helices so that deviations above or below the equal helical sense population will be reflected in chiral optical properties of opposite sign.

8. The method of claim 7, wherein the chiral optical effect is selected from a group of chiral optical effects consisting of optical activity and circular dichroism and chiral based fluorescence.

9. The method of claim 2 wherein, as the temperature deviates above or below from the equal helical sense population the intensity of the chiral optical property will increase with opposite sign.

10. The method in claim 2 wherein structurally different chiral non-racemic units are a part of the helical array and are bound to it along the backbone of the helix, or are side groups to the helix and that the temperature dependent competition for helical sense control among these groups control the helical sense population.

11. The method in claim 1 wherein the helical array is selected from a group consisting of (a) a covalently bound helical arrangement, (b) a supramolecular arrangement, (c) a combination of covalently bound helical arrangement and a supermolecular arrangement, and (d) a molecular array that forms a helical shape under any set of conditions.

12. The method in claim 1 wherein the helical array forms a part of a low glass transition temperature plastic that can be formed into any convenient shape with a long path length such as cm or dm, thereby enhancing the detection of chiral optical changes.

13. A method for switching an optical effect to provide optical switching, the method comprising:
a) providing a helical array, the helical array including or being attached to molecular units, which favor opposing helical senses; and
b) measuring a chiral optical effect in a molecule forming a part of the helical array, wherein the chiral optical effect is a function of a helical sense of the helical array; and
c) reversibly changing the temperature so that the effect on the helical sense changes a sign of the optical effect, or changes the optical effect in a quantitative manner within one sign.

14. A method for switching a chiral optical effect to provide optical switching, the method comprising:
a) providing a helical array, the helical array including or being attached to molecular units, which favor opposing helical senses; and
b) measuring a chiral optical effect in a molecule forming a part of the helical array, wherein the chiral optical effect is a function of a helical sense of the helical array; and
c) reversibly changing the temperature around a compensation temperature at which the helical senses of the helical array are equally populated, wherein the compensation temperature can be varied to any value within a wide temperature range.

15. A composition of matter suitable for temperature measurement, the composition of matter comprising:
a) a helical array; and
b) molecular units that favor opposing helical senses, the molecular units included in, or attached to, the helical array, wherein a proportion of the molecular units, which favor opposing helical senses is selected such that the helical array has a predetermined optical activity at a predetermined temperature.

16. The composition of matter of claim 15 wherein the molecular units are structurally different, chiral, non-racemic molecules.

17. The composition of matter of claim 15 wherein the composition of matter exhibits a chiral optical effect that changes as a function of temperature.

18. The composition of matter of claim 15 wherein the molecular units are part of the helical array.

19. The composition of matter of claim 15, wherein for a given composition of the molecular units affecting the helical array sense, any deviation from the temperature at which the helical senses are equally populated will cause the helical array to favor one sense.

20. The composition of matter of claim 16, wherein for a particular composition of the structurally different chiral, non-racemic, molecular units affecting the helical array sense, the temperature in its effect on the helical sense population will be seen as a change in a chiral optical effect.

21. The composition of matter of claim 20, wherein the chiral optical effect is selected from a group of chiral optical effects consisting of optical activity and circular dichroism at various wavelengths and other chiral optical effects that may be based on fluorescence.

22. The composition of matter of claim 15 wherein some of the side groups on the helical array may act as an effective solvent to allow the molecular movements necessary for the helical sense changes arising from the temperature changes.

* * * * *